(12) United States Patent
Sharma et al.

(10) Patent No.: US 12,136,123 B2
(45) Date of Patent: Nov. 5, 2024

(54) SYSTEMS AND METHODS FOR DATA MONITORING

(71) Applicant: Capital One Services, LLC, McLean, VA (US)

(72) Inventors: Nimit Sharma, Brambleton, VA (US); Olivia Lewis Broeker, Arlington Heights, IL (US); Sripriya Tenepalli, Falls Church, VA (US); Bonnie Vig, San Francisco, CA (US); Alex Wu, Diamond Bar, CA (US)

(73) Assignee: CAPITAL ONE SERVICES, LLC, McLean, VA (US)

( * ) Notice: Subject to any disclaimer, the term of this patent is extended or adjusted under 35 U.S.C. 154(b) by 66 days.

(21) Appl. No.: 17/959,567

(22) Filed: Oct. 4, 2022

(65) Prior Publication Data
US 2024/0112257 A1    Apr. 4, 2024

(51) Int. Cl.
*G06Q 40/00*    (2023.01)
*G06F 3/0481*    (2022.01)
*G06Q 40/03*    (2023.01)

(52) U.S. Cl.
CPC .......... *G06Q 40/03* (2023.01); *G06F 3/0481* (2013.01)

(58) Field of Classification Search
CPC .............................. G06Q 40/03; G06F 3/0481
USPC ...................................... 705/35–45
See application file for complete search history.

(56) References Cited

U.S. PATENT DOCUMENTS

| | | | |
|---|---|---|---|
| 11,030,535 B1* | 6/2021 | Arora | G06N 5/04 |
| 2015/0356547 A1* | 12/2015 | Abed | G06Q 20/322 |
| | | | 705/39 |
| 2020/0320503 A1* | 10/2020 | Mell | G06Q 20/204 |
| 2020/0334649 A1* | 10/2020 | Veznedaroglu | G06K 7/10722 |
| 2022/0188790 A1* | 6/2022 | Gordon | G06Q 20/202 |
| 2022/0188791 A1* | 6/2022 | Gordon | G06Q 20/42 |
| 2023/0259948 A1* | 8/2023 | Paulson | G06N 20/10 |
| | | | 705/44 |
| 2023/0385844 A1* | 11/2023 | Laptiev | G06Q 20/407 |

* cited by examiner

*Primary Examiner* — Hai Tran
(74) *Attorney, Agent, or Firm* — TROUTMAN PEPPER HAMILTON SANDERS LLP; Christopher J. Forstner; John A. Morrissett

(57) ABSTRACT

Disclosed embodiments may include a system for data monitoring. The system may receive data associated with a user. The system may determine a rating corresponding to the user based on the received data. The system may dynamically generate a score by aggregating the rating and a respective second rating of additional user(s). The system may determine whether the score satisfies a first threshold. Responsive to determining the score satisfies the first threshold, the system may cause a user device to display, via a GUI, the score in a first format. Responsive to determining the score does not satisfy the first threshold, the system may determine whether the score satisfies a second threshold. Responsive to determining the score satisfies the second threshold, the system may generate a first modified GUI comprising the score in a second format, and may cause the user device to display the first modified GUI.

9 Claims, 9 Drawing Sheets

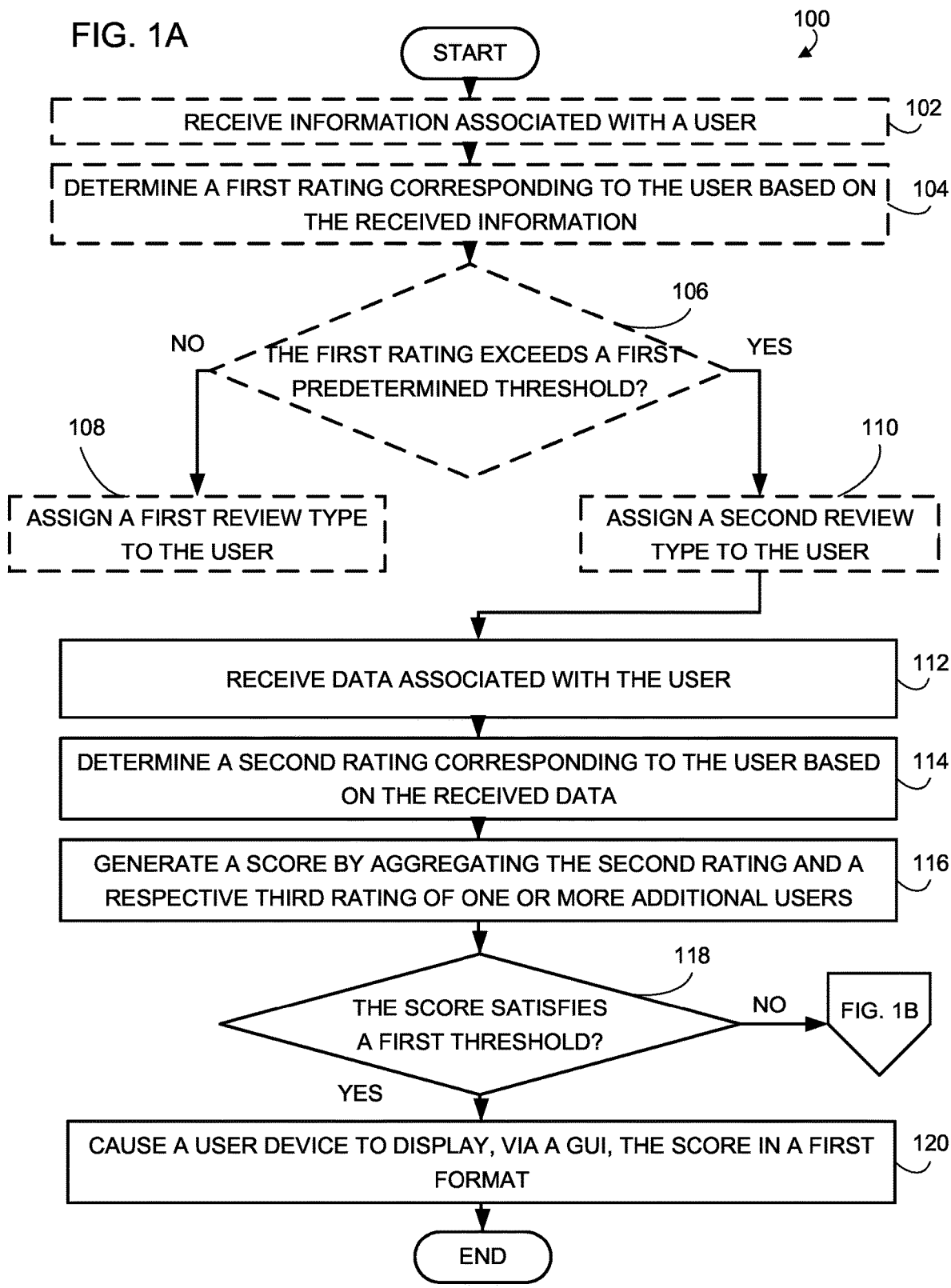

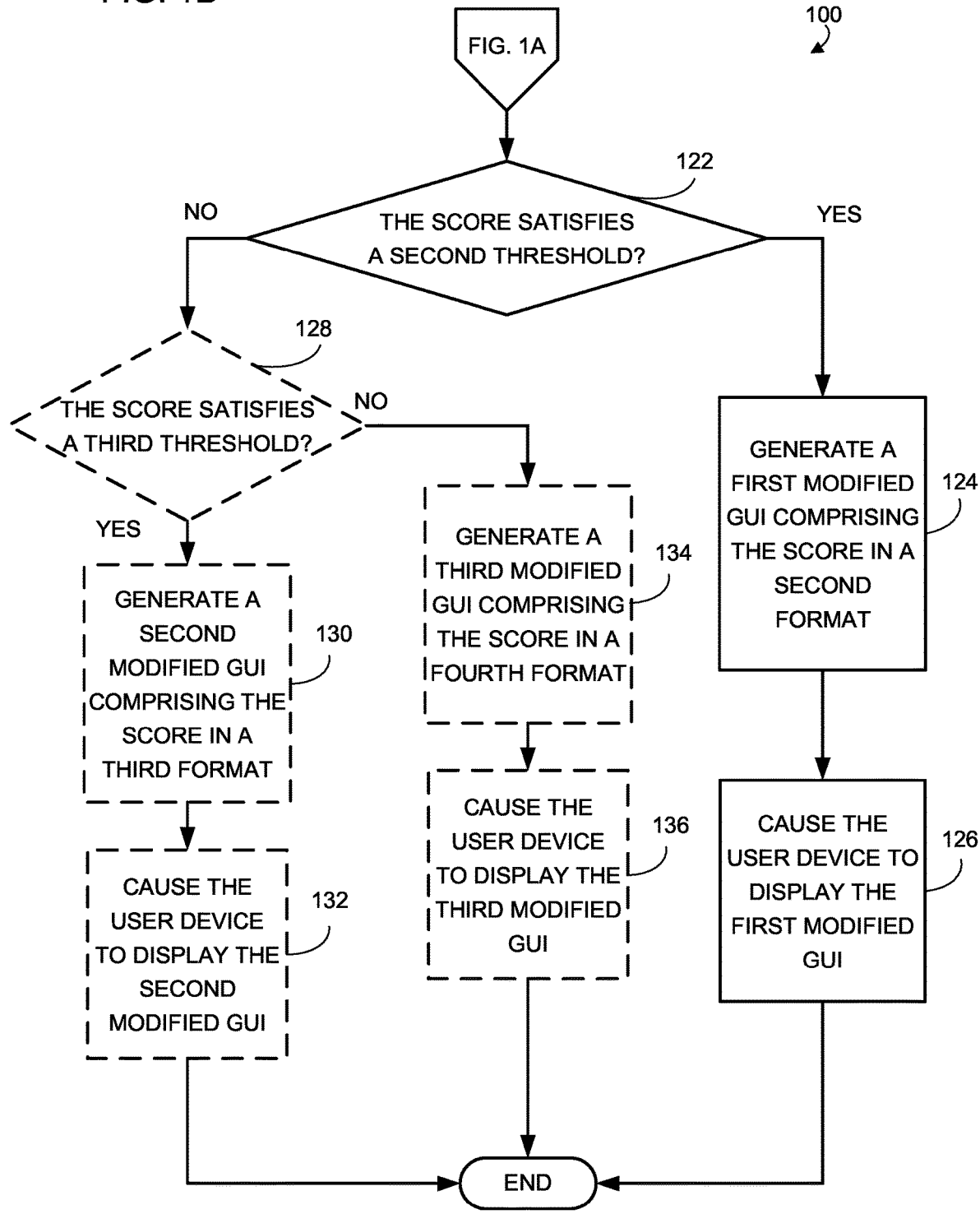

| MONITORING → | | | CREDIT APPROVAL → | | | REMEDIAL MANAGEMENT → | | | RISK RATING ACCURACY → | | | VIEW ALL LINESHEETS ⌄ |
|---|---|---|---|---|---|---|---|---|---|---|---|---|
| SAT. | NEEDS IMP. | UNSAT. | SAT. | NEEDS IMP. | UNSAT. | SAT. | NEEDS IMP. | UNSAT. | PD CONF. | PD NOT CONF. | LGD CONF. | LGD NOT CONF. |
| 145 | 20 | 1 | 191 | 6 | 0 | 39 | 4 | 0 | 218 | 11 | 228 | 1 |
| 67 | 1 | 0 | 64 | 3 | 0 | 21 | 1 | 0 | 70 | 4 | 74 | 0 |
| 21 | 5 | 1 | 24 | 3 | 0 | 2 | 1 | 0 | 28 | 4 | 31 | 1 |
| 92 | 9 | 0 | 98 | 5 | 0 | 19 | 4 | 0 | 113 | 5 | 117 | 1 |
| 203 | 10 | 2 | 210 | 2 | 1 | 31 | 4 | 0 | 231 | 15 | 242 | 4 |
| 32 | 1 | 0 | 32 | 0 | 0 | 32 | 1 | 0 | 36 | 2 | 39 | 0 |
| 560 | 46 | 4 | 619 | 19 | 1 | 144 | 15 | 0 | 696 | 41 | 731 | 7 |
| 9 | 14 | 4 | 31 | 3 | 1 | 4 | 0 | 0 | 35 | 5 | 38 | 2 |
| 31 | 0 | 0 | 31 | 0 | 0 | 0 | 0 | 0 | 31 | 0 | 18 | 0 |

FROM FIG. 2A

FIG. 2A (cont.)

| MONITORING | | | CREDIT APPROVAL | | | REMEDIAL MANAGEMENT | | | RISK RATING ACCURACY | | | |
|---|---|---|---|---|---|---|---|---|---|---|---|---|
| SAT. | NEEDS IMP. | UNSAT. | SAT. | NEEDS IMP. | UNSAT. | SAT. | NEEDS IMP. | UNSAT. | PD CONF. | PD NOT CONF. | LGD CONF. | LGD NOT CONF. |
| 145 | 20 | 1 | 191 | 6 | 0 | 39 | 4 | 0 | 218 | 11 | 228 | 1 |
| 67 | 1 | 0 | 64 | 3 | 0 | 21 | 1 | 0 | 70 | 4 | 74 | 0 |
| 21 | 5 | 1 | 24 | 3 | 0 | 2 | 1 | 0 | 28 | 4 | 31 | 1 |
| 92 | 9 | 0 | 98 | 5 | 1 | 19 | 4 | 0 | 113 | 5 | 117 | 1 |
| 203 | 10 | 2 | 210 | 2 | 0 | 31 | 4 | 0 | 231 | 15 | 242 | 4 |
| 32 | 1 | 0 | 32 | 0 | 1 | 32 | 1 | 0 | 36 | 2 | 39 | 0 |
| 560 | 46 | 4 | 619 | 19 | 1 | 144 | 15 | 0 | 696 | 41 | 731 | 7 |
| 9 | 14 | 4 | 31 | 3 | 0 | 4 | 0 | 0 | 35 | 5 | 38 | 2 |
| 31 | 0 | 0 | 31 | 0 | 0 | 0 | 0 | 0 | 31 | 0 | 18 | 0 |

VIEW [ALL LINESHEETS ▼]

FIG. 2B (cont.)

TEST SCRIPT ROLLUP BY PROCESS

FILTER HAS BEEN APPLIED. SHOWING 1 OF 6 CREDIT PROCESSES FOR 2 OF 7 LOBS

| TOTAL LINESHEETS | CRE → 244 | | | | | | HTF → 123 | | | | | |
|---|---|---|---|---|---|---|---|---|---|---|---|---|
| UNDERWRITING | YES | %YES | NO | %NO | NA | %NA | YES | %YES | NO | %NO | NA | %NA |
| PRIMARY SOURCE OF REPAYMENT IDENTIFIED/ANALYZED/ADDRESSED | 82 | 36% | 1 | 0% | 146 | 64% | 67 | 57% | 7 | 6% | 44 | 37% |
| KEY BUSINESS RISKS IDENTIFIED | 82 | 36% | 1 | 0% | 146 | 64% | 71 | 60% | 4 | 3% | 43 | 36% |
| FINANCIAL COVENANTS APPROPRIATE FOR OVERALL RISKS | 45 | 20% | 4 | 2% | 180 | 79% | 46 | 39% | 6 | 5% | 66 | 56% |
| QUALITY/FREQUENCY OF FINANCIAL REPORTING APPROPRIATE GIVEN... | 58 | 25% | 5 | 2% | 166 | 72% | 55 | 47% | 0 | 0% | 63 | 53% |
| METRIC AND/OR STRUCTURAL EXCEPTIONS IDENTIFIED AND MITIGATED | 60 | 26% | 1 | 0% | 168 | 73% | 42 | 36% | 4 | 3% | 72 | 61% |
| METRIC AND/OR STRUCTURAL EXCEPTIONS APPROPRIATELY DOCUM... | 71 | 31% | 3 | 1% | 155 | 68% | 48 | 41% | 4 | 3% | 66 | 56% |
| SECONDARY SOURCES OF REPAYMENT IDENTIFIED/ANALYZED/ADDR... | 65 | 28% | 1 | 0% | 163 | 71% | 68 | 58% | 4 | 3% | 46 | 39% |
| EXIT STRATEGIES ANALYSIS ROBUST TO ADDRESS DEPENDENCY ON... | 66 | 29% | 2 | 1% | 161 | 70% | 67 | 57% | 1 | 1% | 50 | 42% |
| COLLATERAL APPROPRIATELY EVALUATED | 58 | 25% | 0 | 0% | 171 | 75% | 70 | 59% | 1 | 1% | 47 | 40% |
| MATURITY/AMORITIZATION APPROPRIATE | 61 | 27% | 7 | 3% | 161 | 70% | 68 | 58% | 5 | 4% | 45 | 38% |
| PROJECTIONS PREPARED, ASSUMPTIONS REASONABLE/WELL SUPPO... | 61 | 27% | 2 | 1% | 166 | 72% | 68 | 58% | 2 | 2% | 48 | 41% |
| ASSESS INDUSTRY/MARKET ANALYSIS PERFORMED BY LOB | 80 | 35% | 0 | 0% | 149 | 65% | 74 | 63% | 1 | 1% | 43 | 36% |
| GUARANTOR ANALYSIS ROBUST AND COMPLETE | 37 | 16% | 1 | 0% | 191 | 83% | 19 | 16% | 1 | 1% | 98 | 83% |
| ALL UNDERWRITING DEFICIENCIES NOTED | 78 | 34% | 5 | 2% | 146 | 64% | 73 | 62% | 2 | 2% | 43 | 36% |

FIG. 2C

SYSTEMS AND METHODS FOR DATA MONITORING

The disclosed technology relates to systems and methods for data monitoring. Specifically, this disclosed technology relates to the dynamic review and standardization of user risk management.

BACKGROUND

Traditional systems and methods for data monitoring typically require user-specific data, as well as frequent review of this user-specific data to ensure the accurate capturing of any necessary changes. As such, there are limitations as to these systems being able to provide standardized and real-time data monitoring across a variety of users.

Accordingly, there is a need for improved systems and methods for data monitoring. Embodiments of the present disclosure are directed to this and other considerations.

SUMMARY

Disclosed embodiments may include a system for data monitoring. The system may include one or more processors, and memory in communication with the one or more processors and storing instructions that, when executed by the one or more processors, are configured to cause the system to provide data monitoring. The system may receive information associated with a user (e.g., an entity and/or obligor). The system may determine a first rating or risk score (e.g., associated with the credit worthiness of a user) corresponding to the user based on the received information. The system may determine whether the first rating or risk score exceeds a first predetermined threshold. Responsive to determining the first rating or risk score exceeds a first predetermined threshold, the system may assign a first review type to the user (e.g., comprehensive, streamlined, etc.). The system may receive data associated with the user (e.g., obligor), wherein the data is based on the first review type. The system may determine a second rating corresponding to the user (e.g., obligor) based on the received data. The system may generate a process score by aggregating the second rating and a respective third rating of one or more additional users. The system may determine whether the process score satisfies a first threshold. Responsive to determining the score satisfies the first threshold, the system may cause a user device to display, via a graphical user interface (GUI), the score in a first format. Responsive to determining the score does not satisfy the first threshold, the system may determine whether the score satisfies a second threshold. Responsive to determining the score satisfies the second threshold, the system may generate a first modified GUI comprising the score in a second format, and may cause the user device to display the first modified GUI. Responsive to determining the score does not satisfy the second threshold, the system may determine whether the score satisfies a third threshold. Responsive to determining the score satisfies the third threshold, the system may generate a second modified GUI comprising the score in a third format, and may cause the user device to display the second modified GUI. Responsive to determining the score does not satisfy the third threshold, the system may generate a third modified GUI comprising the score in a fourth format, and may cause the user device to display the third modified GUI.

Disclosed embodiments may include a system for data monitoring. The system may include one or more processors, and memory in communication with the one or more processors and storing instructions that, when executed by the one or more processors, are configured to cause the system to provide data monitoring. The system may receive data associated with a user. The system may determine a rating corresponding to the user based on the received data. The system may dynamically generate a score by aggregating the rating and a respective second rating of one or more additional users. The system may determine whether the score satisfies a first threshold. Responsive to determining the score satisfies the first threshold, the system may cause a user device to display, via a GUI, the score in a first format. Responsive to determining the score does not satisfy the first threshold, the system may determine whether the score satisfies a second threshold. Responsive to determining the score satisfies the second threshold, the system may generate a first modified GUI comprising the score in a second format, and may cause the user device to display the first modified GUI.

Disclosed embodiments may include a system for data monitoring. The system may include one or more processors, and memory in communication with the one or more processors and storing instructions that, when executed by the one or more processors, are configured to cause the system to provide data monitoring. The system may receive data associated with a user. The system may determine a rating corresponding to the user based on the received data. The system may generate a score by aggregating the rating and a respective second rating of one or more additional users. The system may determine whether the score satisfies a first threshold, a second threshold, or a third threshold. Responsive to determining the score satisfies the first threshold, the system may cause a user device to display, via a GUI, the score in a first format. Responsive to determining the score satisfies the second threshold, the system may cause the user device to display, via the GUI, the score in a second format. Responsive to determining the score satisfies the third threshold, the system may cause the user device to display, via the GUI, the score in a third format. Responsive to determining the score does not satisfy the first, second, or third threshold, the system may cause the user device to display, via the GUI, the score in a fourth format.

Further implementations, features, and aspects of the disclosed technology, and the advantages offered thereby, are described in greater detail hereinafter, and can be understood with reference to the following detailed description, accompanying drawings, and claims.

BRIEF DESCRIPTION OF THE DRAWINGS

Reference will now be made to the accompanying drawings, which are not necessarily drawn to scale, and which illustrate various implementations, aspects, and principles of the disclosed technology. In the drawings:

FIGS. 1A-1B are a flow diagram illustrating an exemplary method for data monitoring in accordance with certain embodiments of the disclosed technology.

FIGS. 2A-2C are diagrams of an example dynamic dashboard used to provide data monitoring, according to an example implementation of the disclosed technology.

DETAILED DESCRIPTION

Figure 2A:
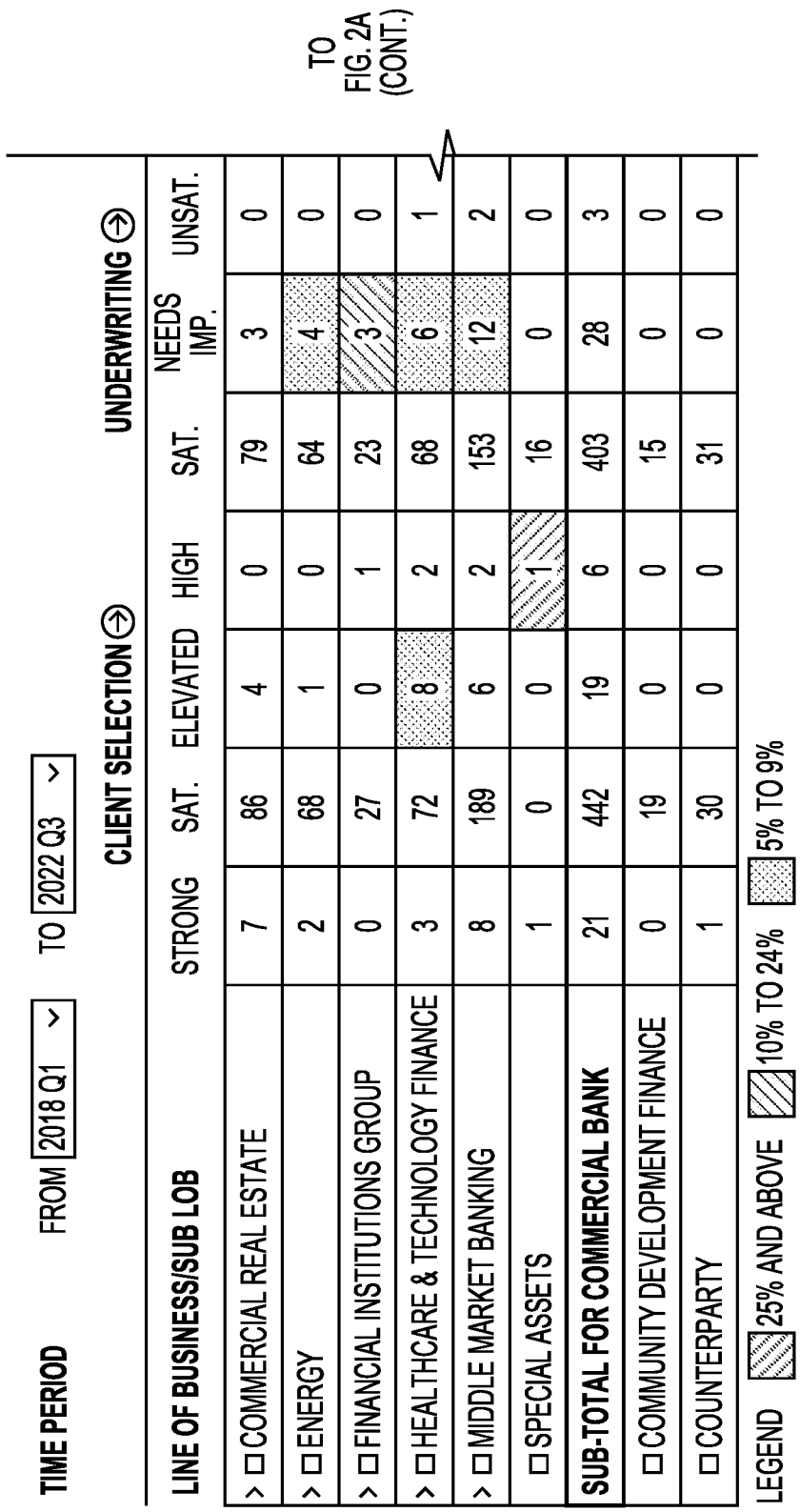

Examples of the present disclosure may relate to systems and methods for data monitoring. More particularly, the disclosed technology may relate to dynamic review and standardization of user risk management, such as credit risk management associated with a specific entity and/or obligor. The systems and methods described herein may utilize, in some instances, machine learning models (MLMs), which are necessarily rooted in computers and technology. Machine learning models are a unique computer technology that involves training models to complete tasks and make decisions. The present disclosure details determining what type of user review (e.g., a credit review for an entity and/or obligor) is required, and based on the determined review type, determining user risk ratings (e.g., credit risk ratings associated with an entity and/or obligor) based on responses to a series of questions associated with various user risk categories (e.g., credit review categories). This, in some examples, may involve using a rules engine to determine a type of review to perform based on initially received responses to one or more questions. Additionally, this, in some examples, may involve using historical data, such as from past responses to questions, and a machine learning model (MLM), applied to determine a type of review to perform for a plurality of users and/or a series of questions applicable to a plurality of users, to output user risk ratings and aggregated risk scores based on responses to the reviews and/or questions. Using an MLM in this way may allow the system to provide dynamic and standardized risk management across a plurality of users. This is a clear advantage and improvement over prior technologies that require frequent review and adjustment of user-specific data because these technologies may not provide a way to provide standardized risk management across a variety of users. Furthermore, examples of the present disclosure may also improve the speed with which computers can provide user risk ratings. Overall, the systems and methods disclosed have significant practical applications in the data monitoring field because of the noteworthy improvements of the standardized risk rating determinations, which are important to solving present problems with this technology.

The systems and methods described herein may also utilize, in some instances, graphical user interfaces (GUIs), which are necessarily rooted in computers and technology. Graphical user interfaces are a computer technology that allows for user interaction with computers through touch, pointing devices, or other means. The present disclosure details generating aggregate scores based on determined user risk ratings, and modifying GUIs to include the scores in various formats depending on whether the scores exceed certain predetermined thresholds. This, in some examples, may involve the continuous monitoring of user data and generated risk ratings to dynamically change the GUI so that aggregate scores may be displayed in various formats, such as colors, which involves using non-generic computer components. Using a GUI in this way may allow the system to provide standardized user risk management with increased accuracy and usability. This is a clear advantage and improvement over prior technologies that typically provide only periodic updating and displaying of user data. Furthermore, examples of the present disclosure may also improve the speed with which computers can provide such re-formatting and displaying of data. Overall, the systems and methods disclosed have significant practical applications in the data monitoring field because of the noteworthy improvements of the real-time generating and displaying of modified GUIs, which are important to solving present problems with this technology.

Some implementations of the disclosed technology will be described more fully with reference to the accompanying drawings. This disclosed technology may, however, be embodied in many different forms and should not be construed as limited to the implementations set forth herein. The components described hereinafter as making up various elements of the disclosed technology are intended to be illustrative and not restrictive. Many suitable components that would perform the same or similar functions as components described herein are intended to be embraced within the scope of the disclosed electronic devices and methods.

Reference will now be made in detail to example embodiments of the disclosed technology that are illustrated in the accompanying drawings and disclosed herein. Wherever convenient, the same reference numbers will be used throughout the drawings to refer to the same or like parts.

Figure 2B:
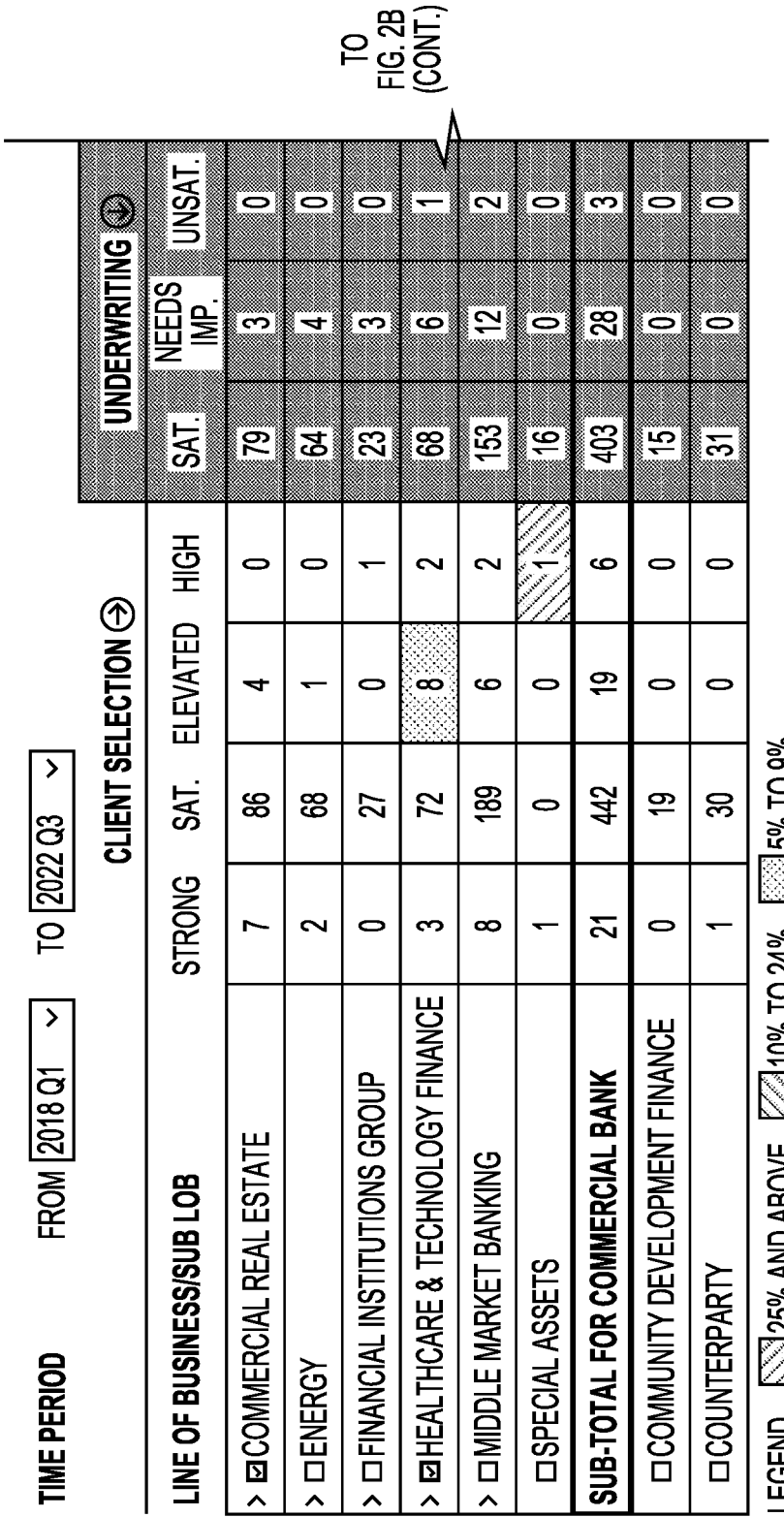

FIGS. 1A-1B are a flow diagram illustrating an exemplary method 100 for data monitoring, in accordance with certain embodiments of the disclosed technology. The steps of method 100 may be performed by one or more components of the system 400 (e.g., data review system 320 or web server 410 of data monitoring system 408 or user device 402), as described in more detail with respect to FIGS. 3 and 4. FIGS. 2A-2C provide examples of a dynamic dashboard that may be used in conjunction with the exemplary method 100, and as such, will be described simultaneously herein.

In optional block 102 of FIG. 1A, the data review system 320 may receive information associated with a user. For example, a user may be a customer of an organization, such as a financial organization, that may own and/or operate data review system 320. The user may be an obligor (or potential obligor), e.g., owing or potentially owing the financial organization payback on an extended loan or other line of credit. The organization may receive information associated with the user's ability to repay the loan or credit, such as information relating to the user's financial portfolio, business portfolio, entity information, credit history, transaction history, and the like. The organization may receive this information by retrieving the information from a user profile or account corresponding to the user, e.g., if the user is a current account holder of the organization. The organization may also receive this information by requesting it from the user when the user initially requests a loan or other line of credit, and/or from a system operator associated with the organization and tasked with reviewing a certain user (e.g., during a credit review process of the user).

In optional block 104 of FIG. 1A, the data review system 320 may determine a first rating corresponding to the user based on the received information. For example, the data review system 320 may assign a rating to the user (e.g., on a scale from 1-10, 1-16, etc.) based on the received information associated with the user's credit worthiness. In some embodiments, the first rating may be determined by a MLM trained to compare the received information to historical information corresponding to a variety of users, along with a training set of assigned ratings to each of the variety of users, to determine what rating the current user should receive. As discussed further below, the determined rating for a user may dictate the type of review process the system conducts with respect to that particular user.

In optional block 106 of FIG. 1A, the data review system 320 may determine whether the first rating exceeds a predetermined threshold. For example, if the rating scale being used is a scale of 1-16, a predetermined threshold may be set at 10. The predetermined threshold may be selected such that users determined to have a rating above such threshold are deemed as being more credit worthy compared to users who are determined to have a rating below such threshold. In some embodiments, the system may utilize a trained MLM to determine whether the first rating exceeds the predetermined threshold.

In optional block 108 of FIG. 1A, responsive to determining the first rating does not exceed the first predetermined threshold, the data review system 320 may assign a first review type to the user. For example, the first review type may include a comprehensive review type. As discussed above in block 106, the first rating may fall below the predetermined threshold, and thus the user may be deemed less credit worthy compared to other users. As such, a comprehensive review, e.g., one that requires more information, questions, analysis, etc., than a streamlined review, as discussed below, may be assigned to the user.

In optional block 110 of FIG. 1A, responsive to determining the first rating exceeds the first predetermined threshold, the data review system 320 may assign a second review type to the user. The second review type may be a more streamlined review in comparison to the comprehensive review discussed above. For example, if the user's rating was found to exceed the predetermined threshold, thus indicating the user to have a higher credit worthiness compared to other users, the system may assign a streamlined review type. The streamlined review type may require, for example, less information, fewer questions, less analysis, etc., than a comprehensive review, as discussed above. It should be appreciated that any number of review types, each with varying requirements of questions, answers, analysis, etc., and each associated with a different predetermined threshold, may be implemented. For example, if using a rating scale of 1-16, as discussed above, three different thresholds of 4, 8, and 12 may be set and the system configured to determine whether each user of a plurality of users falls above or below each of those thresholds. A user may be assigned a first, second, third, or fourth review type depending on whether the user's rating falls within the 1-4, 5-8, 9-12, or 13-16 predetermined threshold ranges.

In some embodiments, in block 108 and/or 110 discussed above, the system may utilize a trained MLM to assign either the first or second review type to the user. In some embodiments, upon making its determination to assign either the first or second review type, the MLM may generate a recommendation of review type for a given user such that the system may accept or reject the model's recommendation. In some embodiments, the system may be configured to automatically accept and implement the MLM's recommended review type for a given user.

In block 112 of FIG. 1A, the data review system 320 may receive data associated with the user (e.g., the entity and/or obligor). For example, whether the system implements a first or second (or other) review type for the user, the system may receive responses to one or more predetermined series of questions, each series of questions relating to a different risk category associated with the user's credit worthiness, e.g., underwriting, credit approval, remedial management, and the like. The data review system 320 may receive the data, for example, directly from a system operator via a GUI of a user device (e.g., user device 402). For example, a system operator may "respond" to each series of questions by, e.g., selecting from dropdown menus, radio button selectors, etc. Alternatively, the data review system 320 may receive the data by retrieving it from another source, such as an account or profile associated with the user.

In block 114 of FIG. 1A, the data review system 320 may determine a second rating corresponding to the user based on the received data. For example, the second rating may be selected from among one or more choices of the user's level of credit worthiness, e.g., satisfactory, needs improvement, unsatisfactory, strong, and the like. In some embodiments, the data review system 320 may be configured to determine or assign a second rating corresponding to the user for each of a plurality of categories, for example, credit approval, underwriting, remedial management, client selection, monitoring, etc., as particularly shown in FIGS. 2A-2B and further discussed below. For example, a system operator may respond to a respective series of questions associated with one or more of these categories, and the system may be configured to determine a second rating corresponding to the user for each of the categories. For example, a rating in each of these categories may be indicative of how well that specific user handles its business within each category.

In block 116 of FIG. 1A, the data review system 320 may generate a score by aggregating the second rating and a respective second rating of one or more additional users. For example, the data review system 320 may be configured to group or categorize different users depending on their line or type of business (e.g., real estate, energy, healthcare, etc.), and within each business or sub-business category, aggregate the respective second rating of each of the users to generate an overall score for that grouping of users. The score may provide an indication of the credit worthiness across that grouping of users, such as by being configured as a percentage of the total number of grouping users. In some embodiments, when the data review system 320 is configured to determine or assign a second rating corresponding to a user for each of a plurality of categories, as discussed above with respect to block 114, the data review system 320 may be configured to generate a plurality of aggregate scores for a single grouping of users, where each aggregate score may represent the grouping's credit worthiness in a specific predefined category. For example, the data review system 320 may generate three different aggregate scores associated with a grouping of users, the first aggregate score corresponding to underwriting, the second corresponding to credit approval, and the third corresponding to remedial management. A benefit of this type of categorization is that an organization owning and/or operating data review system 320 may be able to track how different business lines compare with respect to performing various aspects of a crediting process.

In some embodiments, and as particularly shown in FIGS. 2A-2C, the system may be configured to generate a dynamic dashboard comprising all aggregate scores for each grouping of users, as discussed above. For example, the dashboard may include a column indicating various lines of business or sub-lines of business (Sub Lob), such as commercial real estate, energy, financial institutions group, etc. In some embodiments, the dashboard may be configured such that each line corresponds to a different line of business or Sub Lob, and displays that business line's aggregate scores in each of a variety of categories, such as client selection, underwriting, monitoring, etc. The system may transmit the dashboard for display via a GUI of a user device (e.g., user device 402).

In block 118 of FIG. 1A, the data review system 320 may determine whether the score satisfies a first threshold. For example, if the generated aggregate score represents a percentage of the total number of grouping users, as discussed above, the system may be configured to determine whether the score is greater than or equal to 25%.

In block 120 of FIG. 1A, in response to determining the score satisfies the first threshold, the data review system 320 may cause a user device to display, via a GUI, the score in a first format. For example, if the score is determined to be greater than or equal to 25%, as discussed above, the review system 320 may cause a user device to display the score in a first color, e.g., red. As other examples, the score may be formatted in a variety of ways, such as, in a bold font, underlined font, in a box with a red border, etc.

In some embodiments, and as particularly shown in FIGS. 2A-2C, the score may be displayed as part of a dynamic dashboard, as discussed above. The dashboard may include one or more selectable user input options or objects (e.g., a dropdown menu, radio button selector, text field, etc.) such that the data review system 320 may be configured to receive a system operator selection of a first user input object, generate a modified GUI based on the system operator selection, and cause the user device to display the modified GUI. For example, the system operator selection may comprise a specific time period or range, such as a year and quarter (e.g., 2018 Q1 to 2022 Q3). The system may be configured to re-format the displayed aggregate scores based on the selected time period. In such case, a system operator may be able to see how different aggregate scores (e.g., of different business types/categories) change with respect to varying time periods. For example, upon a time period being selected by a system operator, the dashboard may be configured such that those boxes containing scores greater than or equal to 25% within that selected time period, may be displayed in a particular format to help a system operator distinguish those score boxes from the surrounding boxes that might not satisfy that same first threshold during that time period.

As another example, the system operator selection may comprise a specific grouping of scores, such as only those scores corresponding to a specific line of business and/or only those scores corresponding to a specific category of credit worthiness (e.g., credit approval, underwriting, remedial management, client selection, monitoring, etc.). For example, as particularly shown in FIG. 2B, a system operator may select one or more business lines, such as commercial real estate and healthcare & technology finance, and a certain category of credit worthiness, such as underwriting. Based on the system operator selection, the system may be configured to generate a modified GUI that filters and displays those selected groupings of business lines and/or categories of credit worthiness. For example, as particularly shown in FIG. 2C, the dashboard may be configured to drill down into the selected business lines and credit worthiness category to provide the system operator with additional data. For example, FIG. 2C shows the dashboard drilling down into commercial real estate (CRE) and healthcare & technology finance (HTF) within the underwriting category, and providing even more specific data (e.g., additional aggregate scores) across various sub-categories (e.g., primary source of repayment identified/analyzed/addressed, key business risks identified, etc.). In some embodiments, the modified GUI may be configured such that a system operator can filter even further, for example, to view aggregate scores of individual entities or customers within a business category and/or of sub-categories of credit worthiness.

Turning to FIG. 1B, in block 122, in response to determining the score does not satisfy the first threshold, the data review system 320 may determine whether the score satisfies a second threshold. For example, if the score is not greater than or equal to 25%, the data review system 320 may determine whether the score is between and/or inclusive of 10-24%. In such embodiments where a dynamic dashboard is used for displaying the data, as discussed herein, aggregate score boxes may be displayed in a different format to help a system operator distinguish from surrounding score boxes that do not satisfy the second threshold, as particularly shown in FIGS. 2A-2B.

In block 124, in response to determining the score satisfies the second threshold, the data review system 320 may generate a first modified GUI comprising the score in a second format, such as in a second color (e.g., orange). In some embodiments where a plurality of aggregate scores are displayed via a dynamic dashboard, as discussed above, the first modified GUI may be generated such that different scores are simultaneously re-formatted in real-time. For example, a first modified GUI may modify a first cell comprising a first score from a first format to a second format (e.g., from red to orange), while simultaneously modifying a second cell comprising a second score from a third format to a fourth format (e.g., from yellow to red), etc. A benefit of generating modified GUIs in this way is that as data is received and analyzed in real-time, for example as discussed with respect to blocks 112 and 114 above, the data review system 320 may be configured to dynamically modify a GUI to provide updated information corresponding to a plurality of users (e.g., entities and/or obligors).

In block 126, the data review system 320 may cause the user device to display the first modified GUI. For example, the data review system 320 may transmit the first modified GUI to a user device (e.g., user device 402) for display to a system operator.

In optional block 128, in response to determining the score does not satisfy the second threshold, the data review system 320 may determine whether the score satisfies a third threshold. For example, if the score is not between and/or inclusive of 10-24%, the data review system 320 may determine whether the score is between and/or inclusive of 5-9%.

In optional block 130, in response to determining the score satisfies the third threshold, the data review system 320 may generate a second modified GUI comprising the score in a third format, such as in a third color (e.g., yellow). This step may be the same as or similar to block 124, discussed above.

In optional block 132, the data review system 320 may cause the user device to display the second modified GUI. For example, the data review system 320 may transmit the second modified GUI to a user device (e.g., user device 402) for display to a system operator. This step may be the same as or similar to block 126, discussed above.

In optional block 134, in response to determining the score does not satisfy the third threshold, the data review system 320 may generate a third modified GUI comprising the score in a fourth format, such as in a fourth color (e.g., white). This step may be the same as or similar to block 124 and/or 130, discussed above.

In optional block 136, the data review system 320 may cause the user device to display the third modified GUI. For example, the data review system 320 may transmit the third modified GUI to a user device (e.g., user device 402) for display to a system operator. This step may be the same as or similar to block 126 and/or 132, discussed above.

Figure 3:
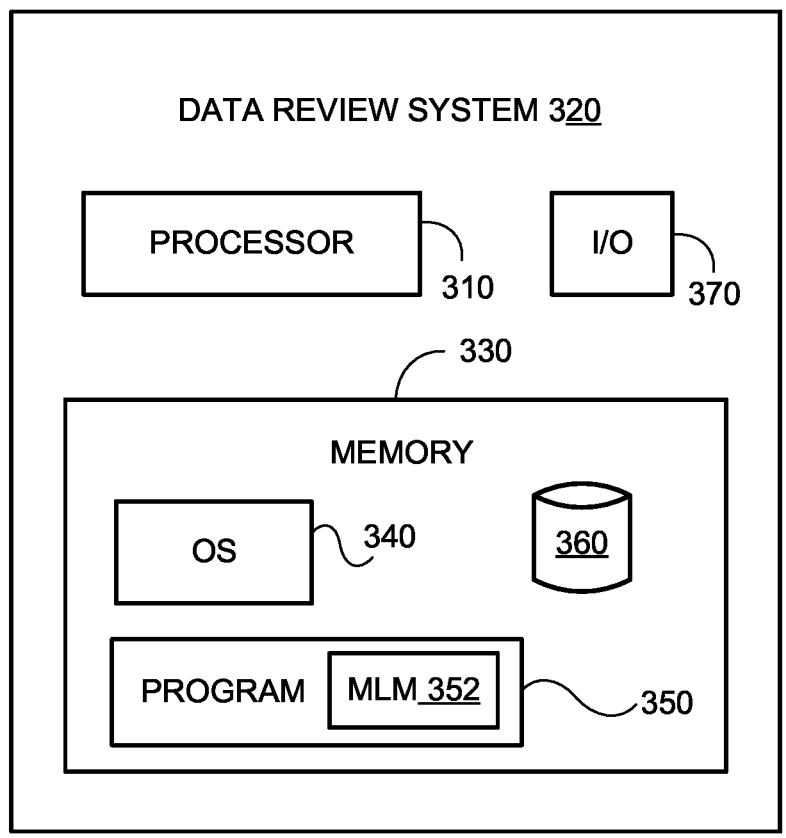
FIG. 3 is block diagram of an example data review system used to provide data monitoring, according to an example implementation of the disclosed technology.
Figure 4:
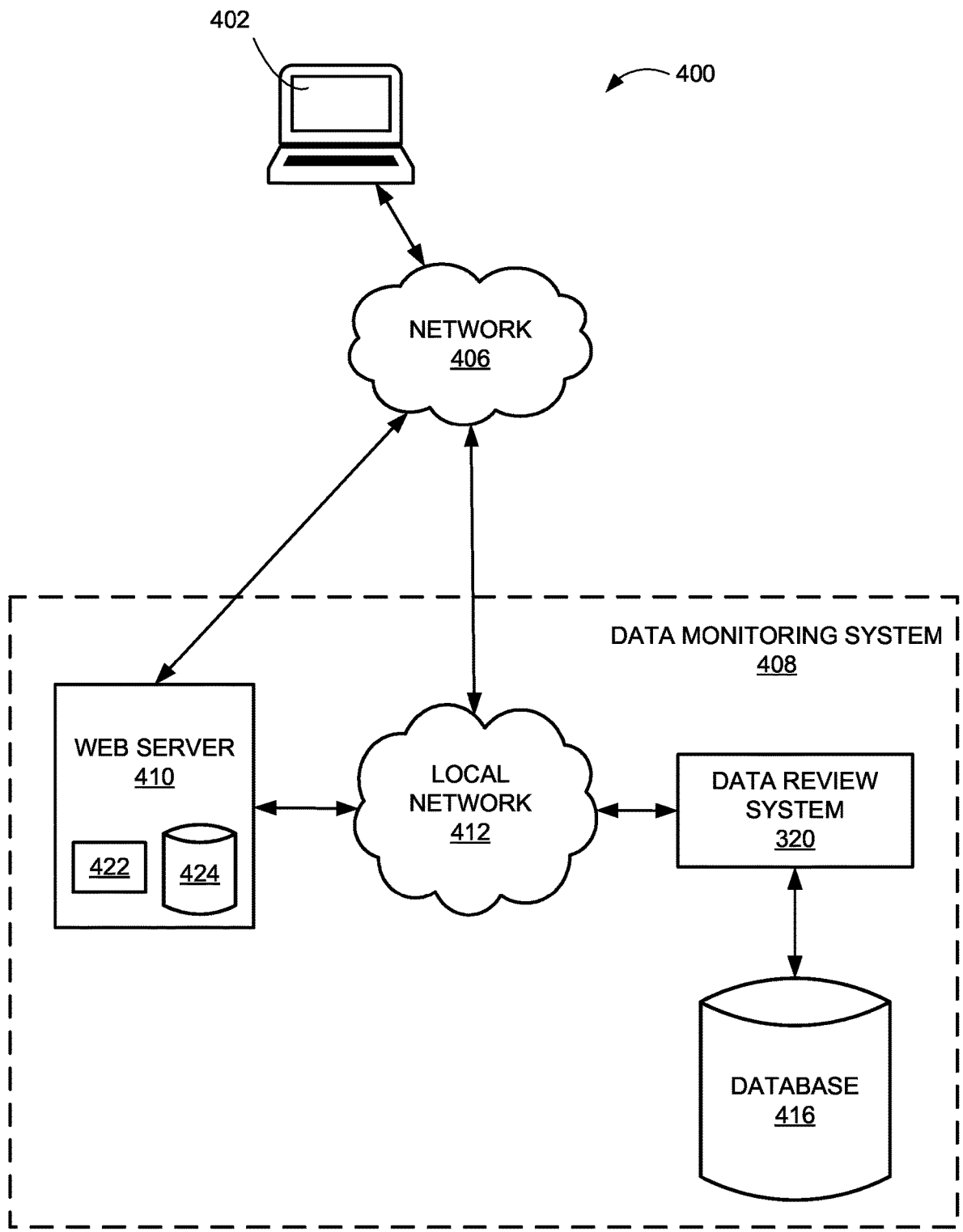
FIG. 4 is block diagram of an example system that may be used to provide data monitoring, according to an example implementation of the disclosed technology.

FIG. 3 is a block diagram of an example data review system 320 used to determine a type of review to conduct for various users (e.g., entities and/or obligors) and/or a series of questions to apply to various users' review processes (e.g., credit review processes) to aid in generating user risk ratings and aggregate user risk rating scores, according to an example implementation of the disclosed technology. According to some embodiments, the user device 402 and web server 410, as depicted in FIG. 4 and described below, may have a similar structure and components that are similar to those described with respect to data review system 320 shown in FIG. 3. As shown, the data review system 320 may include a processor 310, an input/output (I/O) device 370, a memory 330 containing an operating system (OS) 340 and a program 350. In some embodiments, program 350 may include an MLM 352 that may be trained, for example, to determine what type of alert should be provided to a user and at what time. In certain implementations, MLM 352 may issue commands in response to processing an event, in accordance with a model that may be continuously or intermittently updated. Moreover, processor 310 may execute one or more programs (such as via a rules-based platform or the trained MLM 352), that, when executed, perform functions related to disclosed embodiments.

In certain example implementations, the data review system 320 may be a single server or may be configured as a distributed computer system including multiple servers or computers that interoperate to perform one or more of the processes and functionalities associated with the disclosed embodiments. In some embodiments data review system 320 may be one or more servers from a serverless or scaling server system. In some embodiments, the data review system 320 may further include a peripheral interface, a transceiver, a mobile network interface in communication with the processor 310, a bus configured to facilitate communication between the various components of the data review system 320, and a power source configured to power one or more components of the data review system 320.

A peripheral interface, for example, may include the hardware, firmware and/or software that enable(s) communication with various peripheral devices, such as media drives (e.g., magnetic disk, solid state, or optical disk drives), other processing devices, or any other input source used in connection with the disclosed technology. In some embodiments, a peripheral interface may include a serial port, a parallel port, a general-purpose input and output (GPIO) port, a game port, a universal serial bus (USB), a micro-USB port, a high-definition multimedia interface (HDMI) port, a video port, an audio port, a Bluetooth™ port, a near-field communication (NFC) port, another like communication interface, or any combination thereof.

In some embodiments, a transceiver may be configured to communicate with compatible devices and ID tags when they are within a predetermined range. A transceiver may be compatible with one or more of: radio-frequency identification (RFID), near-field communication (NFC), Bluetooth™, low-energy Bluetooth™ (BLE), WiFi™, Zig-Bee™, ambient backscatter communications (ABC) protocols or similar technologies.

A mobile network interface may provide access to a cellular network, the Internet, or another wide-area or local area network. In some embodiments, a mobile network interface may include hardware, firmware, and/or software that allow(s) the processor(s) 310 to communicate with other devices via wired or wireless networks, whether local or wide area, private or public, as known in the art. A power source may be configured to provide an appropriate alternating current (AC) or direct current (DC) to power components.

The processor 310 may include one or more of a microprocessor, microcontroller, digital signal processor, co-processor or the like or combinations thereof capable of executing stored instructions and operating upon stored data. The memory 330 may include, in some implementations, one or more suitable types of memory (e.g. such as volatile or non-volatile memory, random access memory (RAM), read only memory (ROM), programmable read-only memory (PROM), erasable programmable read-only memory (EPROM), electrically erasable programmable read-only memory (EEPROM), magnetic disks, optical disks, floppy disks, hard disks, removable cartridges, flash memory, a redundant array of independent disks (RAID), and the like), for storing files including an operating system, application programs (including, for example, a web browser application, a widget or gadget engine, and or other applications, as necessary), executable instructions and data. In one embodiment, the processing techniques described herein may be implemented as a combination of executable instructions and data stored within the memory 330.

The processor 310 may be one or more known processing devices, such as, but not limited to, a microprocessor from the Core™ family manufactured by Intel™, the Ryzen™ family manufactured by AMD™, or a system-on-chip processor using an ARM™ or other similar architecture. The processor 310 may constitute a single core or multiple core processor that executes parallel processes simultaneously, a central processing unit (CPU), an accelerated processing unit (APU), a graphics processing unit (GPU), a microcontroller, a digital signal processor (DSP), a field-programmable gate array (FPGA), an application-specific integrated circuit (ASIC) or another type of processing component. For example, the processor 310 may be a single core processor that is configured with virtual processing technologies. In certain embodiments, the processor 310 may use logical processors to simultaneously execute and control multiple processes. The processor 310 may implement virtual machine (VM) technologies, or other similar known technologies to provide the ability to execute, control, run, manipulate, store, etc. multiple software processes, applications, programs, etc. One of ordinary skill in the art would understand that other types of processor arrangements could be implemented that provide for the capabilities disclosed herein.

In accordance with certain example implementations of the disclosed technology, the data review system 320 may include one or more storage devices configured to store information used by the processor 310 (or other components) to perform certain functions related to the disclosed embodiments. In one example, the data review system 320 may include the memory 330 that includes instructions to enable the processor 310 to execute one or more applications, such as server applications, network communication processes, and any other type of application or software known to be available on computer systems. Alternatively, the instructions, application programs, etc. may be stored in an external storage or available from a memory over a network. The one or more storage devices may be a volatile or non-volatile, magnetic, semiconductor, tape, optical, removable, non-removable, or other type of storage device or tangible computer-readable medium.

The data review system 320 may include a memory 330 that includes instructions that, when executed by the processor 310, perform one or more processes consistent with the functionalities disclosed herein. Methods, systems, and articles of manufacture consistent with disclosed embodiments are not limited to separate programs or computers configured to perform dedicated tasks. For example, the data review system 320 may include the memory 330 that may include one or more programs 350 to perform one or more functions of the disclosed embodiments. For example, in some embodiments, the data review system 320 may additionally manage dialogue and/or other interactions with the customer via a program 350.

The processor 310 may execute one or more programs 350 located remotely from the data review system 320. For example, the data review system 320 may access one or more remote programs that, when executed, perform functions related to disclosed embodiments.

The memory 330 may include one or more memory devices that store data and instructions used to perform one or more features of the disclosed embodiments. The memory 330 may also include any combination of one or more databases controlled by memory controller devices (e.g., server(s), etc.) or software, such as document management systems, Microsoft™ SQL databases, SharePoint™ databases, Oracle™ databases, Sybase™ databases, or other relational or non-relational databases. The memory 330 may include software components that, when executed by the processor 310, perform one or more processes consistent with the disclosed embodiments. In some embodiments, the memory 330 may include a data review system database 360 for storing related data to enable the data review system 320 to perform one or more of the processes and functionalities associated with the disclosed embodiments.

The data review system database 360 may include stored data relating to status data (e.g., average session duration data, location data, idle time between sessions, and/or average idle time between sessions) and historical status data. According to some embodiments, the functions provided by the data review system database 360 may also be provided by a database that is external to the data review system 320, such as the database 416 as shown in FIG. 4.

The data review system 320 may also be communicatively connected to one or more memory devices (e.g., databases) locally or through a network. The remote memory devices may be configured to store information and may be accessed and/or managed by the data review system 320. By way of example, the remote memory devices may be document management systems, Microsoft™ SQL database, SharePoint™ databases, Oracle™ databases, Sybase™ databases, or other relational or non-relational databases. Systems and methods consistent with disclosed embodiments, however, are not limited to separate databases or even to the use of a database.

The data review system 320 may also include one or more I/O devices 370 that may comprise one or more interfaces for receiving signals or input from devices and providing signals or output to one or more devices that allow data to be received and/or transmitted by the data review system 320. For example, the data review system 320 may include interface components, which may provide interfaces to one or more input devices, such as one or more keyboards, mouse devices, touch screens, track pads, trackballs, scroll wheels, digital cameras, microphones, sensors, and the like, that enable the data review system 320 to receive data from a user (such as, for example, via the user device 402).

In examples of the disclosed technology, the data review system 320 may include any number of hardware and/or software applications that are executed to facilitate any of the operations. The one or more I/O interfaces may be utilized to receive or collect data and/or user instructions from a wide variety of input devices. Received data may be processed by one or more computer processors as desired in various implementations of the disclosed technology and/or stored in one or more memory devices.

The data review system 320 may contain programs that train, implement, store, receive, retrieve, and/or transmit one or more MLMs. Machine learning models may include a neural network model, a generative adversarial model (GAN), a recurrent neural network (RNN) model, a deep learning model (e.g., a long short-term memory (LSTM) model), a random forest model, a convolutional neural network (CNN) model, a support vector machine (SVM) model, logistic regression, decision tree, XGBoost, and/or another machine learning model. Models may include an ensemble model (e.g., a model comprised of a plurality of models). In some embodiments, training of a model may terminate when a training criterion is satisfied. Training criterion may include a number of epochs, a training time, a performance metric (e.g., an estimate of accuracy in reproducing test data), or the like. The data review system 320 may be configured to adjust model parameters during training. Model parameters may include weights, coefficients, offsets, or the like. Training may be supervised or unsupervised.

The data review system 320 may be configured to train MLMs by optimizing model parameters and/or hyperparameters (hyperparameter tuning) using an optimization technique, consistent with disclosed embodiments. Hyperparameters may include training hyperparameters, which may affect how training of the model occurs, or architectural hyperparameters, which may affect the structure of the model. An optimization technique may include a grid search, a random search, a gaussian process, a Bayesian process, a Covariance Matrix Adaptation Evolution Strategy (CMA-ES), a derivative-based search, a stochastic hill-climb, a neighborhood search, an adaptive random search, or the like. The data review system 320 may be configured to optimize statistical models using known optimization techniques.

Furthermore, the data review system 320 may include programs configured to retrieve, store, and/or analyze properties of data models and datasets. For example, data review system 320 may include or be configured to implement one or more data-profiling models. A data-profiling model may include machine learning models and statistical models to determine the data schema and/or a statistical profile of a dataset (e.g., to profile a dataset), consistent with disclosed embodiments. A data-profiling model may include an RNN model, a CNN model, or other machine-learning model.

The data review system 320 may include algorithms to determine a data type, key-value pairs, row-column data structure, statistical distributions of information such as keys or values, or other property of a data schema may be configured to return a statistical profile of a dataset (e.g., using a data-profiling model). The data review system 320 may be configured to implement univariate and multivariate statistical methods. The data review system 320 may include a regression model, a Bayesian model, a statistical model, a linear discriminant analysis model, or other classification model configured to determine one or more descriptive metrics of a dataset. For example, data review system 320 may include algorithms to determine an average, a mean, a standard deviation, a quantile, a quartile, a probability distribution function, a range, a moment, a variance, a covariance, a covariance matrix, a dimension and/or dimensional relationship (e.g., as produced by dimensional analysis such as length, time, mass, etc.) or any other descriptive metric of a dataset.

The data review system 320 may be configured to return a statistical profile of a dataset (e.g., using a data-profiling model or other model). A statistical profile may include a plurality of descriptive metrics. For example, the statistical profile may include an average, a mean, a standard deviation, a range, a moment, a variance, a covariance, a covariance matrix, a similarity metric, or any other statistical metric of the selected dataset. In some embodiments, data review system 320 may be configured to generate a similarity metric representing a measure of similarity between data in a dataset. A similarity metric may be based on a correlation, covariance matrix, a variance, a frequency of overlapping values, or other measure of statistical similarity.

The data review system 320 may be configured to generate a similarity metric based on data model output, including data model output representing a property of the data model. For example, data review system 320 may be configured to generate a similarity metric based on activation function values, embedding layer structure and/or outputs, convolution results, entropy, loss functions, model training data, or other data model output). For example, a synthetic data model may produce first data model output based on a first dataset and a produce data model output based on a second dataset, and a similarity metric may be based on a measure of similarity between the first data model output and the second-data model output. In some embodiments, the similarity metric may be based on a correlation, a covariance, a mean, a regression result, or other similarity between a first data model output and a second data model output. Data model output may include any data model output as described herein or any other data model output (e.g., activation function values, entropy, loss functions, model training data, or other data model output). In some embodiments, the similarity metric may be based on data model output from a subset of model layers. For example, the similarity metric may be based on data model output from a model layer after model input layers or after model embedding layers. As another example, the similarity metric may be based on data model output from the last layer or layers of a model.

The data review system 320 may be configured to classify a dataset. Classifying a dataset may include determining whether a dataset is related to another datasets. Classifying a dataset may include clustering datasets and generating information indicating whether a dataset belongs to a cluster of datasets. In some embodiments, classifying a dataset may include generating data describing the dataset (e.g., a dataset index), including metadata, an indicator of whether data element includes actual data and/or synthetic data, a data schema, a statistical profile, a relationship between the test dataset and one or more reference datasets (e.g., node and edge data), and/or other descriptive information. Edge data may be based on a similarity metric. Edge data may and indicate a similarity between datasets and/or a hierarchical relationship (e.g., a data lineage, a parent-child relationship). In some embodiments, classifying a dataset may include generating graphical data, such as anode diagram, a tree diagram, or a vector diagram of datasets. Classifying a dataset may include estimating a likelihood that a dataset relates to another dataset, the likelihood being based on the similarity metric.

The data review system 320 may include one or more data classification models to classify datasets based on the data schema, statistical profile, and/or edges. A data classification model may include a convolutional neural network, a random forest model, a recurrent neural network model, a support vector machine model, or another machine learning model. A data classification model may be configured to classify data elements as actual data, synthetic data, related data, or any other data category. In some embodiments, data review system 320 is configured to generate and/or train a classification model to classify a dataset, consistent with disclosed embodiments.

The data review system 320 may also contain one or more prediction models. Prediction models may include statistical algorithms that are used to determine the probability of an outcome, given a set amount of input data. For example, prediction models may include regression models that estimate the relationships among input and output variables. Prediction models may also sort elements of a dataset using one or more classifiers to determine the probability of a specific outcome. Prediction models may be parametric, non-parametric, and/or semi-parametric models.

In some examples, prediction models may cluster points of data in functional groups such as "random forests." Random Forests may comprise combinations of decision tree predictors. (Decision trees may comprise a data structure mapping observations about something, in the "branch" of the tree, to conclusions about that thing's target value, in the "leaves" of the tree.) Each tree may depend on the values of a random vector sampled independently and with the same distribution for all trees in the forest. Prediction models may also include artificial neural networks. Artificial neural networks may model input/output relationships of variables and parameters by generating a number of interconnected nodes which contain an activation function. The activation function of a node may define a resulting output of that node given an argument or a set of arguments. Artificial neural networks may generate patterns to the network via an 'input layer', which communicates to one or more "hidden layers" where the system determines regressions via a weighted connections. Prediction models may additionally or alternatively include classification and regression trees, or other types of models known to those skilled in the art. To generate prediction models, the data review system may analyze information applying machine-learning methods.

While the data review system 320 has been described as one form for implementing the techniques described herein, other, functionally equivalent, techniques may be employed. For example, some or all of the functionality implemented via executable instructions may also be implemented using firmware and/or hardware devices such as application specific integrated circuits (ASICs), programmable logic arrays, state machines, etc. Furthermore, other implementations of the data review system 320 may include a greater or lesser number of components than those illustrated.

FIG. 4 is a block diagram of an example system that may be used to view and interact with data monitoring system 408, according to an example implementation of the disclosed technology. The components and arrangements shown in FIG. 4 are not intended to limit the disclosed embodiments as the components used to implement the disclosed processes and features may vary. As shown, data monitoring system 408 may interact with a user device 402 via a network 406. In certain example implementations, the data monitoring system 408 may include a local network 412, a data review system 320, a web server 410, and a database 416.

In some embodiments, a system operator may operate the user device 402. The user device 402 can include one or more of a mobile device, smart phone, general purpose computer, tablet computer, laptop computer, telephone, public switched telephone network (PSTN) landline, smart wearable device, voice command device, other mobile computing device, or any other device capable of communicating with the network 406 and ultimately communicating with one or more components of the data monitoring system 408. In some embodiments, the user device 402 may include or incorporate electronic communication devices for hearing or vision impaired users.

According to some embodiments, the user device 402 may include an environmental sensor for obtaining audio or visual data, such as a microphone and/or digital camera, a geographic location sensor for determining the location of the device, an input/output device such as a transceiver for sending and receiving data, a display for displaying digital images, one or more processors, and a memory in communication with the one or more processors.

The data review system 320 may include programs (scripts, functions, algorithms) to configure data for visualizations and provide visualizations of datasets and data models on the user device 402. This may include programs to generate graphs and display graphs. The data review system 320 may include programs to generate histograms, scatter plots, time series, or the like on the user device 402. The data review system 320 may also be configured to display properties of data models and data model training results including, for example, architecture, loss functions, cross entropy, activation function values, embedding layer structure and/or outputs, convolution results, node outputs, or the like on the user device 402.

The network 406 may be of any suitable type, including individual connections via the internet such as cellular or WiFi networks. In some embodiments, the network 406 may connect terminals, services, and mobile devices using direct connections such as RFID, NFC, Bluetooth™, BLE, WiFi™, ZigBee™, ABC protocols, USB, WAN, or LAN. Because the information transmitted may be personal or confidential, security concerns may dictate one or more of these types of connections be encrypted or otherwise secured. In some embodiments, however, the information being transmitted may be less personal, and therefore the network connections may be selected for convenience over security.

The network 406 may include any type of computer networking arrangement used to exchange data. For example, the network 406 may be the Internet, a private data network, virtual private network (VPN) using a public network, and/or other suitable connection(s) that enable(s) components in the system 400 environment to send and receive information between the components of the system 400. The network 406 may also include a PSTN and/or a wireless network.

The data monitoring system 408 may be associated with and optionally controlled by one or more entities such as a business, corporation, individual, partnership, or any other entity that provides one or more of goods, services, and consultations to individuals such as customers. In some embodiments, the data monitoring system 408 may be controlled by a third party on behalf of another business, corporation, individual, partnership. The data monitoring system 408 may include one or more servers and computer systems for performing one or more functions associated with products and/or services that the organization provides.

Web server 410 may include a computer system configured to generate and provide one or more websites accessible to customers, as well as any other individuals involved in access system 408's normal operations. Web server 410 may include a computer system configured to receive communications from user device 402 via for example, a mobile application, a chat program, an instant messaging program, a voice-to-text program, an SMS message, email, or any other type or format of written or electronic communication. Web server 410 may have one or more processors 422 and one or more web server databases 424, which may be any suitable repository of website data. Information stored in web server 410 may be accessed (e.g., retrieved, updated, and added to) via local network 412 and/or network 406 by one or more devices or systems of system 400. In some embodiments, web server 410 may host websites or applications that may be accessed by the user device 402. For example, web server 410 may host a financial service provider website that a user device may access by providing an attempted login that are authenticated by the data review system 320. According to some embodiments, web server 410 may include software tools, similar to those described with respect to user device 402 above, that may allow web server 410 to obtain network identification data from user device 402. The web server may also be hosted by an online provider of website hosting, networking, cloud, or backup services, such as Microsoft Azure™ or Amazon Web Services™.

The local network 412 may include any type of computer networking arrangement used to exchange data in a localized area, such as WiFi, Bluetooth™, Ethernet, and other suitable network connections that enable components of the data monitoring system 408 to interact with one another and to connect to the network 406 for interacting with components in the system 400 environment. In some embodiments, the local network 412 may include an interface for communicating with or linking to the network 406. In other embodiments, certain components of the data monitoring system 408 may communicate via the network 406, without a separate local network 406.

The data monitoring system 408 may be hosted in a cloud computing environment (not shown). The cloud computing environment may provide software, data access, data storage, and computation. Furthermore, the cloud computing environment may include resources such as applications (apps), VMs, virtualized storage (VS), or hypervisors (HYP). User device 402 may be able to access data monitoring system 408 using the cloud computing environment. User device 402 may be able to access data monitoring system 408 using specialized software. The cloud computing environment may eliminate the need to install specialized software on user device 402.

In accordance with certain example implementations of the disclosed technology, the data monitoring system 408 may include one or more computer systems configured to compile data from a plurality of sources the data review system 320, web server 410, and/or the database 416. The data review system 320 may correlate compiled data, analyze the compiled data, arrange the compiled data, generate derived data based on the compiled data, and store the compiled and derived data in a database such as the database 416. According to some embodiments, the database 416 may be a database associated with an organization and/or a related entity that stores a variety of information relating to customers, transactions, ATM, and business operations. The database 416 may also serve as a back-up storage device and may contain data and information that is also stored on, for example, database 360, as discussed with reference to FIG. 3.

Embodiments consistent with the present disclosure may include datasets. Datasets may comprise actual data reflecting real-world conditions, events, and/or measurements. However, in some embodiments, disclosed systems and methods may fully or partially involve synthetic data (e.g., anonymized actual data or fake data). Datasets may involve numeric data, text data, and/or image data. For example, datasets may include transaction data, financial data, demographic data, public data, government data, environmental data, traffic data, network data, transcripts of video data, genomic data, proteomic data, and/or other data. Datasets of the embodiments may be in a variety of data formats including, but not limited to, PARQUET, AVRO, SQLITE, POSTGRESQL, MYSQL, ORACLE, HADOOP, CSV, JSON, PDF, JPG, BMP, and/or other data formats.

Datasets of disclosed embodiments may have a respective data schema (e.g., structure), including a data type, key-value pair, label, metadata, field, relationship, view, index, package, procedure, function, trigger, sequence, synonym, link, directory, queue, or the like. Datasets of the embodiments may contain foreign keys, for example, data elements that appear in multiple datasets and may be used to cross-reference data and determine relationships between datasets. Foreign keys may be unique (e.g., a personal identifier) or shared (e.g., a postal code). Datasets of the embodiments may be "clustered," for example, a group of datasets may share common features, such as overlapping data, shared statistical properties, or the like. Clustered datasets may share hierarchical relationships (e.g., data lineage).

Example Use Case

The following example use case describes an example of a typical user flow pattern. This section is intended solely for explanatory purposes and not in limitation.

In one example, an entity may request to take out a loan from a financial institution. The financial institution may own and/or operate a risk management system configured to evaluate the credit worthiness of the entity for purposes of determining whether to provide the entity with the requested loan. The system may be configured to utilize a trained MLM to receive financial and business information associated with the entity, and use that information to determine what type of review should be conducted for evaluating this entity. Based on the received information, the model may determine that the entity's potential credit worthiness exceeds a predetermined threshold, and thus the entity only needs to be evaluated through a form of streamlined review process. This streamlined review process may be configured to include 30 specific questions pertaining to the entity's credit worthiness. The system may receive answers to these 30 questions by auto-filling information retrieved from the entity's profile or account associated with the financial institution and/or via a system operator associated with the financial institution.

Upon receipt of the 30 answers, the system may be configured to determine, e.g., using a trained MLM, a rating associated with this specific entity (e.g., associated with one or more categories corresponding to credit worthiness), the rating being indicative of the entity's credit worthiness or quality of underwriting or overall risk management. The system may be further configured to determine, e.g., using a trained MLM, a rating associated with one or more processes and/or business categories that support one or more functions (e.g., underwriting). The system may then aggregate the entity's rating with ratings assigned to other entities also being evaluated and falling within a similar business category as the entity. The system may then generate various scores based on those aggregated ratings, the scores indicating, for example, a percentage of entities within that business category that meet certain predefined rankings (e.g., strong, satisfactory, elevated, high, needs improved, unsatisfactory, etc.) in various categories related to a credit review process (e.g., underwriting, credit approval, etc.).

The system may be configured to generate, and cause a user device to display via a GUI, a dynamic dashboard showing the generated scores for the business category, as well as other generated scores for other business categories. The system may cause the user device to display, via the GUI, the dashboard such that certain scores are formatted in certain ways. For example, those scores that equate to 25% or above may be formatted in red, scores including and falling between 10-24% may be formatted in orange, scores including and falling between 5-9% may be formatted in yellow, and all other scores may be formatted in white. As the system receives new evaluations of entities, or receives new information such that it may re-evaluate an existing entity, the system may be configured to generate updated scores and generate modified GUIs such that the displayed scores may be re-formatted (e.g., changed from red to orange) depending on whether they fall into different percent ranges.

A system operator, for example, associated with the financial institution, may then be able to review the dynamic dashboard to evaluate any risk involved to the financial institution for providing loans to the various reviewed entities. In addition, the dashboard may be configured with one or more user input objects such that the system operator may filter the scores in various ways, such as based on time period, business category, credit review process category, etc. The system may be configured to generate a modified GUI, and cause the user device to display such modified GUI, based on any user input object selection received by the system operator.

In some examples, disclosed systems or methods may involve one or more of the following clauses:

Clause 1: A system, comprising: one or more processors; and a memory in communication with the one or more processors and storing instructions that, when executed by the one or more processors, are configured to cause the system to: receive information associated with a user; determine a first rating corresponding to the user based on the received information; determine whether the first rating exceeds a first predetermined threshold; responsive to determining the first rating exceeds a first predetermined threshold, assign a first review type to the user; receive data associated with the user, wherein the data is based on the first review type; determine a second rating corresponding to the user based on the received data; generate a score by aggregating the second rating and a respective third rating of one or more additional users; determine whether the score satisfies a first threshold; responsive to determining the score satisfies the first threshold, cause a user device to display, via a graphical user interface (GUI), the score in a first format; and responsive to determining the score does not satisfy the first threshold: determine whether the score satisfies a second threshold; responsive to determining the score satisfies the second threshold: generate a first modified GUI comprising the score in a second format; and cause the user device to display the first modified GUI; and responsive to determining the score does not satisfy the second threshold: determine whether the score satisfies a third threshold; responsive to determining the score satisfies the third threshold: generate a second modified GUI comprising the score in a third format; and cause the user device to display the second modified GUI; and responsive to determining the score does not satisfy the third threshold: generate a third modified GUI comprising the score in a fourth format; and cause the user device to display the third modified GUI.

Clause 2: The system of clause 1, wherein the instructions are further configured to cause the system to: responsive to determining the first rating does not exceed the first predetermined threshold, assign a second review type to the user; receive second data associated with the user, wherein the second data is based on the second review type; determine a fourth rating corresponding to the user based on the received second data; generate a second score by aggregating the fourth rating and a respective fifth rating of the one or more additional users; determine whether the second score satisfies the first threshold; responsive to determining the second score satisfies the first threshold, cause the user device to display, via the GUI, the second score in the first format; and responsive to determining the second score does not satisfy the first threshold: determine whether the second score satisfies the second threshold; responsive to determining the second score satisfies the second threshold: generate a fourth modified GUI comprising the second score in the second format; and cause the user device to display the fourth modified GUI; and responsive to determining the second score does not satisfy the second threshold: determine whether the second score satisfies the third threshold; responsive to determining the second score satisfies the third threshold: generate a fifth modified GUI comprising the second score in the third format; and cause the user device to display the fifth modified GUI; and responsive to determining the second score does not satisfy the third threshold: generate a sixth modified GUI comprising the second score in the fourth format; and cause the user device to display the sixth modified GUI.

Clause 3: The system of clause 1, wherein determining the first rating and determining whether the first rating exceeds the first predetermined threshold are conducted by a machine learning model (MLM).

Clause 4: The system of clause 1, wherein: the user and the one or more additional users are associated with a shared category; and aggregating the second rating and the respective third rating of the one or more additional users is based on the shared category.

Clause 5: The system of clause 4, wherein the first, second, and third thresholds each comprise a respective percent range of total users within the shared category that satisfy one or more predetermined ratings.

Clause 6: The system of clause 1, wherein the first, second, third, and fourth formats each comprise a different color.

Clause 7: The system of clause 1, wherein the instructions are further configured to cause the system to: receive, via the GUI, a user selection of a first input option; generate a fourth modified GUI comprising the score in a fifth format based on the user selection; and cause the user device to display the fourth modified GUI.

Clause 8: The system of clause 7, wherein the user selection comprises a first time period.

Clause 9: The system of clause 1, wherein the instructions are further configured to cause the system to: receive, via the GUI, a user selection of a first grouping of scores, wherein the first grouping comprises the score and one or more additional aggregate scores; generate a fourth modified GUI comprising one or more data fields corresponding to the first grouping; and cause the user device to display the fourth modified GUI.

Clause 10: A system, comprising: one or more processors; and a memory in communication with the one or more processors and storing instructions that, when executed by the one or more processors, are configured to cause the system to: receive data associated with a user; determine a rating corresponding to the user based on the received data; dynamically generate a score by aggregating the rating and a respective second rating of one or more additional users; determine whether the score satisfies a first threshold; responsive to determining the score satisfies the first threshold, cause a user device to display, via a graphical user interface (GUI), the score in a first format; and responsive to determining the score does not satisfy the first threshold: determine whether the score satisfies a second threshold; and responsive to determining the score satisfies the second threshold: generate a first modified GUI comprising the score in a second format; and cause the user device to display the first modified GUI.

Clause 11: The system of clause 10, wherein the instructions are further configured to cause the system to: receive information associated with the user; determine a first rating corresponding to the user based on the received information; determine whether the first rating exceeds a first predetermined threshold; and responsive to determining the first rating exceeds a first predetermined threshold, assign a first review type to the user, wherein the data is based on the first review type.

Clause 12: The system of clause 10, wherein determining the rating is conducted by a machine learning model (MLM).

Clause 13: The system of clause 10, wherein: the user and the one or more additional users are associated with a shared category; and aggregating the rating and the respective second rating of the one or more additional users is based on the shared category.

Clause 14: The system of clause 13, wherein the first and second thresholds each comprise a respective percent range of total users within the shared category that satisfy one or more predetermined ratings.

Clause 15: The system of clause 10, wherein the instructions are further configured to cause the system to: responsive to determining the score does not satisfy the second threshold: determine whether the score satisfies a third threshold; responsive to determining the score satisfies the third threshold: generate a second modified GUI comprising the score in a third format; and cause the user device to display the second modified GUI; and responsive to determining the score does not satisfy the third threshold: generate a third modified GUI comprising the score in a fourth format; and cause the user device to display the third modified GUI.

Clause 16: The system of clause 10, wherein the instructions are further configured to cause the system to: receive, via the GUI, a user selection of a first input option; generate a fourth modified GUI comprising the score in a fifth format based on the user selection; and cause the user device to display the fourth modified GUI.

Clause 17: The system of clause 16, wherein the user selection comprises a first time period.

Clause 18: The system of clause 10, wherein the instructions are further configured to cause the system to: receive, via the GUI, a user selection of a first grouping of scores, wherein the first grouping comprises the score and one or more additional aggregate scores; generate a fourth modified GUI comprising one or more data fields corresponding to the first grouping; and cause the user device to display the fourth modified GUI.

Clause 19: A system, comprising: one or more processors; and a memory in communication with the one or more processors and storing instructions that, when executed by the one or more processors, are configured to cause the system to: receive data associated with a user; determine a rating corresponding to the user based on the received data; generate a score by aggregating the rating and a respective second rating of one or more additional users; determine whether the score satisfies a first threshold, a second threshold, or a third threshold; responsive to determining the score satisfies the first threshold, cause a user device to display, via a graphical user interface (GUI), the score in a first format; responsive to determining the score satisfies the second threshold, cause the user device to display, via the GUI, the score in a second format; responsive to determining the score satisfies the third threshold, cause the user device to display, via the GUI, the score in a third format; and responsive to determining the score does not satisfy the first, second, or third threshold, cause the user device to display, via the GUI, the score in a fourth format.

Clause 20: The system of clause 19, wherein: the user and the one or more additional users are associated with a shared category; aggregating the rating and the respective second rating of the one or more additional users is based on the shared category; and the first, second, and third thresholds each comprise a respective percent range of total users within the shared category that satisfy one or more predetermined ratings.

The features and other aspects and principles of the disclosed embodiments may be implemented in various environments. Such environments and related applications may be specifically constructed for performing the various processes and operations of the disclosed embodiments or they may include a general-purpose computer or computing platform selectively activated or reconfigured by program code to provide the necessary functionality. Further, the processes disclosed herein may be implemented by a suitable combination of hardware, software, and/or firmware. For example, the disclosed embodiments may implement general purpose machines configured to execute software programs that perform processes consistent with the disclosed embodiments. Alternatively, the disclosed embodiments may implement a specialized apparatus or system configured to execute software programs that perform processes consistent with the disclosed embodiments. Furthermore, although some disclosed embodiments may be implemented by general purpose machines as computer processing instructions, all or a portion of the functionality of the disclosed embodiments may be implemented instead in dedicated electronics hardware.

The disclosed embodiments also relate to tangible and non-transitory computer readable media that include program instructions or program code that, when executed by one or more processors, perform one or more computer-implemented operations. The program instructions or program code may include specially designed and constructed instructions or code, and/or instructions and code well-known and available to those having ordinary skill in the computer software arts. For example, the disclosed embodiments may execute high level and/or low-level software instructions, such as machine code (e.g., such as that produced by a compiler) and/or high-level code that can be executed by a processor using an interpreter.

The technology disclosed herein typically involves a high-level design effort to construct a computational system that can appropriately process unpredictable data. Mathematical algorithms may be used as building blocks for a framework, however certain implementations of the system may autonomously learn their own operation parameters, achieving better results, higher accuracy, fewer errors, fewer crashes, and greater speed.

As used in this application, the terms "component," "module," "system," "server," "processor," "memory," and the like are intended to include one or more computer-related units, such as but not limited to hardware, firmware, a combination of hardware and software, software, or software in execution. For example, a component may be, but is not limited to being, a process running on a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Certain embodiments and implementations of the disclosed technology are described above with reference to block and flow diagrams of systems and methods and/or computer program products according to example embodiments or implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, may be repeated, or may not necessarily need to be performed at all, according to some embodiments or implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks.

As an example, embodiments or implementations of the disclosed technology may provide for a computer program product, including a computer-usable medium having a computer-readable program code or program instructions embodied therein, said computer-readable program code adapted to be executed to implement one or more functions specified in the flow diagram block or blocks. Likewise, the computer program instructions may be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Certain implementations of the disclosed technology described above with reference to user devices may include mobile computing devices. Those skilled in the art recognize that there are several categories of mobile devices, generally known as portable computing devices that can run on batteries but are not usually classified as laptops. For example, mobile devices can include, but are not limited to portable computers, tablet PCs, internet tablets, PDAs, ultra-mobile PCs (UMPCs), wearable devices, and smart phones. Additionally, implementations of the disclosed technology can be utilized with internet of things (IoT) devices, smart televisions and media devices, appliances, automobiles, toys, and voice command devices, along with peripherals that interface with these devices.

In this description, numerous specific details have been set forth. It is to be understood, however, that implementations of the disclosed technology may be practiced without these specific details. In other instances, well-known methods, structures, and techniques have not been shown in detail in order not to obscure an understanding of this description. References to "one embodiment," "an embodiment," "some embodiments," "example embodiment," "various embodiments," "one implementation," "an implementation," "example implementation," "various implementations," "some implementations," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

Throughout the specification and the claims, the following terms take at least the meanings explicitly associated herein, unless the context clearly dictates otherwise. The term "connected" means that one function, feature, structure, or characteristic is directly joined to or in communication with another function, feature, structure, or characteristic. The term "coupled" means that one function, feature, structure, or characteristic is directly or indirectly joined to or in communication with another function, feature, structure, or characteristic. The term "or" is intended to mean an inclusive "or." Further, the terms "a," "an," and "the" are intended to mean one or more unless specified otherwise or clear from the context to be directed to a singular form. By "comprising" or "containing" or "including" is meant that at least the named element, or method step is present in article or method, but does not exclude the presence of other elements or method steps, even if the other such elements or method steps have the same function as what is named.

It is to be understood that the mention of one or more method steps does not preclude the presence of additional method steps or intervening method steps between those steps expressly identified. Similarly, it is also to be understood that the mention of one or more components in a device or system does not preclude the presence of additional components or intervening components between those components expressly identified.

Although embodiments are described herein with respect to systems or methods, it is contemplated that embodiments with identical or substantially similar features may alternatively be implemented as systems, methods and/or non-transitory computer-readable media.

As used herein, unless otherwise specified, the use of the ordinal adjectives "first," "second," "third," etc., to describe a common object, merely indicates that different instances of like objects are being referred to, and is not intended to imply that the objects so described must be in a given sequence, either temporally, spatially, in ranking, or in any other manner.

While certain embodiments of this disclosure have been described in connection with what is presently considered to be the most practical and various embodiments, it is to be understood that this disclosure is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain embodiments of the technology and also to enable any person skilled in the art to practice certain embodiments of this technology, including making and using any apparatuses or systems and performing any incorporated methods. The patentable scope of certain embodiments of the technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system, comprising:
    one or more processors; and
    a memory in communication with the one or more processors and storing instructions that, when executed by the one or more processors, are configured to cause the system to:
        receive data associated with creditworthiness of a user;
        determine a rating corresponding to the user based on the received data;
        dynamically generate a score by aggregating the rating and a second rating respectively associated with each of one or more additional users;
        generate a graphical user interface (GUI) configured to dynamically display the score;
        determine whether the score satisfies a first threshold;
        responsive to determining the score satisfies the first threshold, cause a user device to display, via the GUI, the score in a first format;
        responsive to determining the score does not satisfy the first threshold:
            determine whether the score satisfies a second threshold;
            responsive to determining the score satisfies the second threshold:
                modify the GUI to generate a first modified GUI by re-formatting the score into a second format; and
                cause the user device to display the first modified GUI; and
            responsive to determining the score does not satisfy the second threshold:
                determine whether the score satisfies a third threshold;

responsive to determining the score satisfies the third threshold:
  modify the GUI to generate a second modified GUI by re-formatting the score into a third format; and
  cause the user device to display the second modified GUI; and
responsive to determining the score does not satisfy the third threshold:
  modify the GUI to generate a third modified GUI by re-formatting the score into a fourth format; and
  cause the user device to display the third modified GUI.

2. The system of claim 1, wherein the instructions are further configured to cause the system to:
receive information associated with the user, wherein the information comprises one or more of financial information, transaction information, business information, entity information, account information, profile information, or combinations thereof;
determine a first rating corresponding to the user based on the received information;
determine whether the first rating exceeds a first predetermined threshold; and
responsive to determining the first rating exceeds a first predetermined threshold, assign a first review type to the user,
  wherein the data is based on the first review type.

3. The system of claim 1, wherein determining the rating is conducted by a machine learning model (MLM).

4. The system of claim 1, wherein:
the user and the one or more additional users are associated with a shared category; and
aggregating the rating and the respective second rating of the one or more additional users is based on the shared category.

5. The system of claim 4, wherein the first and second thresholds each comprise a respective percent range of total users within the shared category that satisfy one or more predetermined ratings.

6. The system of claim 1, wherein the instructions are further configured to cause the system to:
receive, via the GUI, a user selection of a first input option;
generate a fourth modified GUI comprising the score in a fifth format based on the user selection; and
cause the user device to display the fourth modified GUI.

7. The system of claim 6, wherein the user selection comprises a first time period.

8. The system of claim 1, wherein the instructions are further configured to cause the system to:
receive, via the GUI, a user selection of a first grouping of scores, wherein the first grouping comprises the score and one or more additional aggregate scores;
generate a fourth modified GUI comprising one or more data fields corresponding to the first grouping; and
cause the user device to display the fourth modified GUI.

9. The system of claim 1, wherein:
the first format comprises one or more of a first color, a first font, a first typographical emphasis, or combinations thereof, and
the second format comprises one or more of a second color, a second font, a second typographical emphasis, or combinations thereof.

* * * * *